United States Patent Office 2,967,818
Patented Jan. 10, 1961

2,967,818
METHOD FOR SEPARATION OF BITUMINOUS MATERIALS

Leo Garwin, Oklahoma City, Okla., assignor to Kerr-McGee Oil Industries, Inc., a corporation of Delaware No Drawing. Filed Apr. 21, 1958, Ser. No. 729,529

11 Claims. (Cl. 208—45)

This invention relates to a process for using a new class of solvents for effecting the separation of asphalt and related bituminous materials into their components at elevated temperature and pressure. More particularly, this invention relates to the use of the cycloparaffin hydrocarbons having less than 10 carbon atoms to treat asphalt and related bitumens to effect their separation into components.

The use of low molecular weight aliphatic paraffinic hydrocarbons such as those from methane to hexane to treat reduced crudes, etc., to separate asphalts of varying softening points has been widely practiced and is frequently referred to in the art as propane deasphalting, butane deasphalting, etc. Applicant's co-pending patent application Serial Number 377,201, filed August 23, 1953, and now abandoned, has extended this art to the fluid phase separation of bituminous materials into their major components, i.e. asphaltenes, resins and oils.

Heretofore, when the lower cycloparaffin hydrocarbons such as cyclopentane, cyclohexane, methylcyclopentane, methylcyclohexane, etc., were used to treat bituminous materials, it was observed that these cycloparaffins normally were completely miscible with the bituminous material or that the yield of precipitated material was extremely low. Consequently, the use of the naphthenic hydrocarbons to effect the separation of bituminous materials into asphaltenes, resins and oils, or, for that matter, to separate asphalt from bitumens has never been used commercially, although certain literature references infer that the cycloparaffins may be used at room temperature to effect a slight separation of asphaltic materials from bituminous stocks. At elevated temperatures the bitumens are taught to be extremely soluble in naphthenes.

Therefore, it is a principal object of this invention to provide a method for using the cycloparaffins having less than 10 carbon atoms to separate bituminous materials into at least two component fractions and in yields commensurate with the actual percentage of each fraction present therein.

A further object of this invention is to provide a process for using the low molecular weight cycloparaffins to treat bituminous materials and thereby separate heavy and light fractions in yields up to the maximum amount of each fraction present in said material.

A still further object is to provide a process for using the low molecular weight cycloparaffins to treat bituminous materials to separate a fraction consisting substantially of asphaltenes in yields which may be as high as the maximum amount of asphaltenes present in said materials.

Another object of this invention is to provide a method for separating asphalt and similar materials into their component fractions, i.e. asphaltenes, resins and oils, by means of the low molecular weight cycloparaffins or naphthenic hydrocarbons having less than 10 carbon atoms.

Still other objects will be apparent when taken in connection with the specification and claims.

In accordance with the above objects, a bituminous material is treated with a suitable cycloparaffinic hydrocarbon having less than 10 carbon atoms at elevated temperature and elevated pressure to cause the separation of heavy and light phases or fractions. The light phase may then be further treated at a still higher temperature to effect an additional separation to yield at least two other fractions. It is preferred to adjust the phase volume ratio between the cycloparaffin solvents and the bituminous material to within the range of 5 to 1 to 10 to 1. Although higher and lower phase volume ratios are usable, the preferred ratio is 5 to 10 or up to 15–20 to 1 in some cases. At a solvent to bitumen ratio less than about 2–3 to 1, no satisfactory phase separation occurs. Also, phase volume ratios between 3:1 to 5:1 give separations which indicate some loss in solvent selectivity at their particular ratios.

It is necessary that the relationship between the temperature and pressure at which the separation occurs be correlated to give a certain range of densities for the particular solvent used and for the softening point of the particular bituminous material treated. It has been discovered that the density must be between about 0.50 and 0.27 g./ml. to achieve a significant fractionation of bitumen and preferably the density of the solvent is between about 0.33 and 0.40 g./ml., when separating asphaltenes having a softening point of about 280 to 350° F. To separate an oil fraction essentially free of asphaltenes and resins, the solvent should have a density of about 0.27 to 0.32 g./ml. Thus, it is possible to either raise or lower the temperature within certain limits and yet obtain the same degree of separation provided compensating pressure adjustment is made to give the desired density value for the solvent.

In further illustration of my invention, an asphalt type bituminous material such as a vacuum or steam reduced crude, a propane or butane asphalt, etc., may be treated with a cycloparaffin type solvent such as cyclopentane, methyl cyclopentane, cyclohexane, etc. to separate fractions of substantially pure asphaltenes, resins and oils or mixtures of said fractions provided certain critical operating conditions are present. These critical operating conditions are: (1) that each volume of asphaltic bituminous material must be treated with at least 2 volumes of a cycloparaffin having less than 10 carbon atoms, (2) that the temperature of treatment must be at least 350° F. and no higher than about 500° F., (3) that the pressure must be sufficient to give the solvent a density greater than 0.27 g./ml. and less than about 0.50 g./ml. If the above critical operating conditions are present, the asphalt bituminous substance will separate into a heavy fraction and a light fraction.

Even when the heavy fraction has a softening point in excess of 200° F. it extrudes from the treating vessel as a fluid phase. Thus, the process avoids the difficulties with tower plugging which have been experienced with propane and butane deasphalting to separate high softening point asphalts.

The bituminous materials responsive to this process are the pyrogenous bitumens and the native bitumens. The pyrogenous bitumens include some of the heavy or very low gravity petroleum crudes, reduced crudes, either steam or vacuum refined, hard and soft wood pitches, coal tar residues, cracked tars, tall oil and vegetable pitches, etc., and the native bitumens include gilsonite, wurtzilite, albertite and native asphalt, for instance, Trinidad asphalt, etc.

Specifically, my invention may comprise treating one volume of asphalt of the asphaltic cement grade with 10–15 volumes of cyclopentane at a temperature of about 350–500° F. and at a pressure consistent with a solvent density less than about 0.50 and greater than 0.27 gram per milliliter to separate a heavy fraction having a softening point up to and above 300° F. It is possible, by adjustment of the pressure to certain values, within the above temperature range, to effect a separation of asphaltenes in yields varying from less than about 3% up to about 18%, the latter value being a typical value for the entire asphaltene content present in Mid-Continent type vacuum reduced asphalts.

The nature and scope of my invention is more fully disclosed in the examples herein.

*Example I*

One volume of a vacuum reduced asphalt of 117° F. softening point was treated with 10 volumes of cyclopentane at room temperature, i.e. about 95° F. in a closed flask. The flask was shaken periodically until solution of the asphalt occurred. No visible phase separation occurred. The mixture of asphalt and cyclopentane was filtered through a suction filter. Only traces of insoluble material was deposited on the filter paper. Hence it was apparent that cyclopentane does not fractionate asphalt significantly at these conditions.

*Example II*

The experiment of Example I was repeated except methyl-cyclopentane was substituted for cyclopentane. The results of this experiment disclosed that methyl cyclopentane is no better for fractionating asphalt then cyclopentane at these conditions.

*Example III*

The experiment of Example I was repeated except a blown asphalt having a softening point of 195° F. was substituted for the vacuum reduced asphalt of 117° F. softening point. It was found that cyclopentane did not precipitate a significant yield of heavy fraction.

*Example IV*

Sixty grams of the vacuum reduced asphalt of Example I was placed in a suitable pressure vessel having a sight glass and then 597 cc. of cyclopentane was added to the same vessel. The pressure vessel was closed and placed in a temperature bath. The pressure vessel was shaken periodically until equilibrium conditions were obtained. At the equilibrium condition, the temperature and pressure registered by the thermometer and pressure gauge associated with the vessel were 255° F. and 90 pounds per square inch gauge respectively. The sight glass was examined and no visible phase separation was noticed. Similarly, when the mixture was drained from the vessel, no visible evidence of a phase separation was observed. Hence it is concluded from this experiment that cyclopentane is unable to separate a second phase from bitumens when the temperature and pressure conditions are such that the density of the cyclopentane is 0.62 g./ml. or higher, as illustrated by Example I.

*Example V*

A vacuum residuum of the Mid-Continent type having a softening point of 117° F. was intimately contacted in a closed pressure vessel with 10 volumes of cyclopentane per volume of residuum while the temperature of the system was maintained at 388° F. The pressure was maintained at 540 p.s.i.g. to obtain a solvent density of about 0.52 g./ml. Under these conditions two phases separated in the vessel and the phases were removed from the pressure vessel while in a fluid, extrudable condition. The yield of heavy fraction product was 2.0% by weight; it had a ring and ball softening point of about 400° F. The light fraction had a softening point of at least 100° F.

*Example VI*

The experiment of Example V was repeated using the same solvent and residuum. In this run the percent fill, i.e. amount of bitumen and solvent charged to the vessel at the outset, was controlled to give a final pressure of 440 p.s.i.g. at a separation temperature of 425° F. The density of the solvent under these conditions is about 0.44 g./ml. At this temperature and pressure, the yield of heavy fraction or asphaltenes was 3.5 by weight and the product had a ring and ball softening point in excess of 350° F.

*Example VII*

In this experiment the amount of material charged to the vessel of Example V was further varied, whereby the pressure of the system was 650 p.s.i.g. at a temperature of 450° F. Under these new conditions a yield of 17.6% by weight of asphaltenes, having a ring and ball softening point of 361° F. was obtained as compared to a 2% yield in Example V. The petrolenes or the light phase had a softening point less than 100° F. It is interesting to note that the asphaltene phase was fluid and the phase separation occurred very rapidly. Thus, by maintaining the prescribed temperature to pressure relationship to give a solvent density of about 0.35 it was possible to separate approximately 75% of the asphaltenes present in this particular asphalt.

*Example VIII*

The light fraction from Example VII, i.e. the petrolenes, was charged to a closed pressure vessel and 10 volumes of cyclopentane was added for each volume of petrolenes. The temperature was raised to 456° F. and the pressure was adjusted to give a solvent density less than about 0.35 but greater than about 0.27 g./ml. A phase separation occurred, fractionating the petrolenes into resins and oils. The bottom phase was withdrawn from the vessel and stripped free of solvent by heating to obtain the resins. This resin fraction had a softening point of about 150° F. The other phase, when stripped free of solvent, gave an oil which was fluid at room temperature and had a Saybolt Furol viscosity at 210° F. in excess of 20 seconds.

*Example IX*

A preferred method of separating the oil fraction from its solution in cyclopentane or other cycloparaffin solvent comprises raising the temperature of the system above the critical temperature of the solvent while maintaining a pressure thereon which will give a solvent density less than about 0.25 g./ml. whereby the oil and solvent demix. The pure solvent is the lighter phase and the oil containing some solvent forms the heavier phase. By thus utilizing the tendency of the cycloparaffin to separate from asphalt fractions when the solvent density is less than about 0.27 g./ml. it is possible, in a continuous separation process, to obtain appreciable savings in heat, as well as to reduce the amount of cooling water needed. Furthermore, this means of freeing the asphalt fractions of solvent permits the pressure to be maintained on a series of vessels in a continuous system, and thus reduce the energy required for solvent circulation and reuse.

It can be seen that in accordance with my invention, it is also possible to use the cyclic hydrocarbons as desphalting agents per se.

What I claim is:

1. A process for separating an asphaltic bituminous material including asphaltenes, resins and oils into at least two fractions, which process comprises separating a heavy fraction containing essentially asphaltenes and resins substantially free of asphaltic oils from a lighter solvent fraction containing dissolved residual asphaltic bituminous material including oils by treating in a single treating zone at elevated temperature and pressure each volume of the asphaltic bituminous material with at least two volumes of a solvent consisting essentially of at least one cycloparaffin hydrocarbon having less than ten carbon atoms, the temperature of treatment being at least about 350° F.

and not exceeding about 500° F., the temperature and pressure of treatment being adjusted to maintain liquid phase conditions and provide a solvent density in excess of 0.27 g./ml. and less than about 0.50 g./ml., the separated substantially asphaltic oil-free asphaltene-resin fraction being in the liquid phase and having a viscosity whereby it is freely flowable from the treating zone, and withdrawing the liquid phase asphaltene-resin fraction from the treating zone.

2. A process for separating asphaltic bituminous material including asphaltenes into at least two fractions, which process comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least two volumes of a solvent consisting essentially of at least one cycloparaffin hydrocarbon having less than ten carbon atoms, the temperature of treatment being at least about 350° F. and not exceeding about 500° F., the temperature and pressure of treatment being so adjusted as to maintain liquid phase conditions and provide a solvent density of at least about 0.35 g./ml. and less than about 0.50 g./ml., the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least 300° F.

3. The process of claim 2 wherein the solvent consists essentially of at least on cycloparaffin hydrocarbon selected from the class consisting of cyclopentanes and cyclohexanes.

4. The process of claim 2 wherein each volume of the asphaltic bituminous material is treated with at least five volumes of solvent.

5. The process of claim 2 wherein solvent is recovered from the lighter solvent fraction by adjusting the temperature and pressure to provide a solvent density of less than 0.27 g./ml. and from a solvent phase and a phase containing the residual asphaltic bituminous material, and then separating the solvent phase thus formed from the phase containing the residual asphaltic bituminous material.

6. A process for separating an asphaltic bituminous material including asphaltenes, resins and oils into a plurality of fractions, which process comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least two volumes of a solvent which consists essentially of at least one cycloparaffin hydrocarbon having less than ten carbon atoms, the temperature of treatment being at least about 350° F. and not exceeding about 500° F., the temperature and pressure of treatment being so adjusted as to maintain liquid phase conditions and provide a solvent density of at least about 0.35 g./ml. and not exceeding about 0.50 g./ml., the separated heavy asphaltene fraction being in the liquid phase and having a viscosity whereby it is freely flowable from the treating zone, withdrawing the liquid phase asphaltene fraction from the treating zone, the asphaltene fraction having a softening point of at least about 300° F., separating a resin fraction by treating in a treating zone under further elevated temperature and pressure conditions the lighter solvent fraction containing dissolved residual asphaltic bituminous material, the temperature and pressure of this treatment being adjusted to provide a solvent density of at least 0.27 g./ml. and less than about 0.35 g./ml., the separated resin fraction being in the liquid phase and having a viscosity whereby it is freely flowable from the treating zone, and withdrawing the liquid phase resin fraction from the treating zone.

7. The process of claim 6 wherein the solvent consists essentially of at least one cycloparaffin hydrocarbon selected from the class consisting of cyclopentanes and cyclohexanes.

8. The process of claim 6 wherein each volume of the asphaltic bituminous material is treated with at least five volumes of solvent.

9. The process of claim 6 wherein solvent is recovered from the lighter solvent fraction including oils by adjusting the temperature and pressure to provide a solvent density of less than 0.27 g./ml. and form a solvent phase and a phase containing the oils, and then separating the solvent phase thus formed from the phase containing the oils.

10. A process for separating asphaltic bituminous material including asphaltenes into at least two fractions, which process comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least five volumes of a solvent which consists essentially of at least one cycloparaffin hydrocarbon selected from the class consisting of cyclopentanes and cyclohexanes, the temperature of treatment being at least about 350° F. and not exceeding about 500° F., the temperature and pressure of treatment being so adjusted as to maintain liquid phase conditions and provide a solvent density of at least about 0.35 g./ml. and less than about 0.50 g./ml., the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least 300° F.

11. A process for separating an asphaltic bituminous material including asphaltenes, resins and oils into a plurality of fractions, which process comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least five volumes of a solvent which consists essentially of at least one cycloparaffin selected from the class consisting of cyclopentanes and cyclohexanes, the temperature of treatment being at least about 350° F. and not exceeding about 500° F., the temperature and pressure of treatment being so adjusted as to maintain liquid phase conditions and provide a solvent density of at least about 0.35 g./ml. and not exceeding about 0.50 g./ml., the separated heavy asphaltene fraction being in the liquid phase and having a viscosity whereby it is freely flowable from the treating zone, withdrawing the liquid phase asphaltene fraction from the treating zone, the asphaltene fraction having a softening point of at least about 300° F., separating a resin fraction by treating in a treating zone under further elevated temperature and pressure conditions the lighter solvent fraction containing dissolved residual asphaltic bituminous material, the temperature and pressure of this treatment being adjusted to provide a solvent density of at least 0.27 g./ml. and less than about 0.35 g./ml., the separated resin fraction being in the liquid phase and having a viscosity whereby it is freely flowable from the treating zone, and withdrawing the liquid phase resin fraction from the treating zone.

References Cited in the file of this patent

UNITED STATES PATENTS

| | | |
|---|---|---|
| 1,698,471 | Bransky et al. | Jan. 8, 1929 |
| 2,284,583 | Lewis | May 26, 1942 |
| 2,783,188 | Agoston | Feb. 26, 1957 |

UNITED STATES PATENT OFFICE
CERTIFICATION OF CORRECTION

Patent No. 2,967,818

January 10, 1961

Leo Garwin

It is hereby certified that error appears in the above numbered patent requiring correction and that the said Letters Patent should read as corrected below.

Column 5, line 40, for "from" read -- form --.

Signed and sealed this 27th day of June 1961.

(SEAL)
Attest:

ERNEST W. SWIDER

Attesting Officer

DAVID L. LADD

Commissioner of Patents